Aug. 25, 1953

L. A. PARADISE 2,649,677

MULTIROW CROP HARVESTER

Filed April 13, 1951

INVENTOR.
L. A. Paradise
BY
Attorney

Aug. 25, 1953  L. A. PARADISE  2,649,677
MULTIROW CROP HARVESTER
Filed April 13, 1951  3 Sheets-Sheet 2
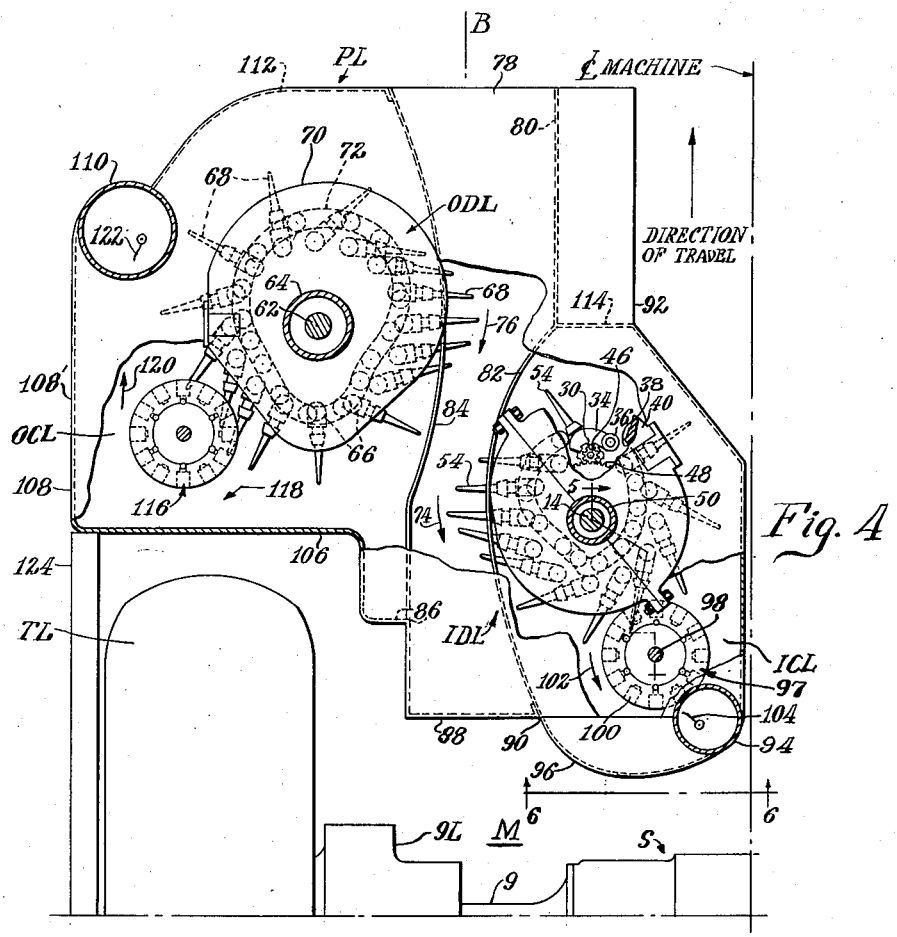
Fig. 4
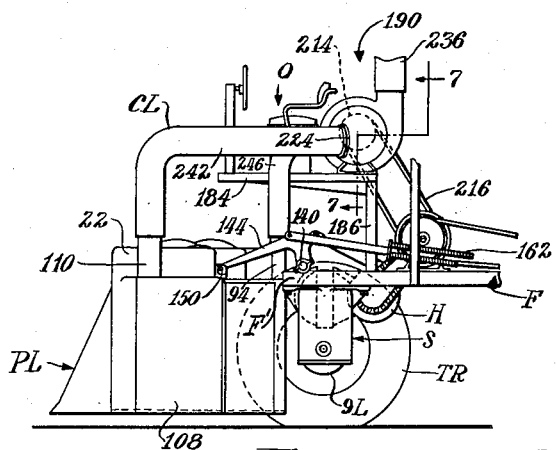
Fig. 3
INVENTOR.
L. A. Paradise
BY
Attorney Aug. 25, 1953 L. A. PARADISE 2,649,677
MULTIROW CROP HARVESTER
Filed April 13, 1951 3 Sheets-Sheet 3
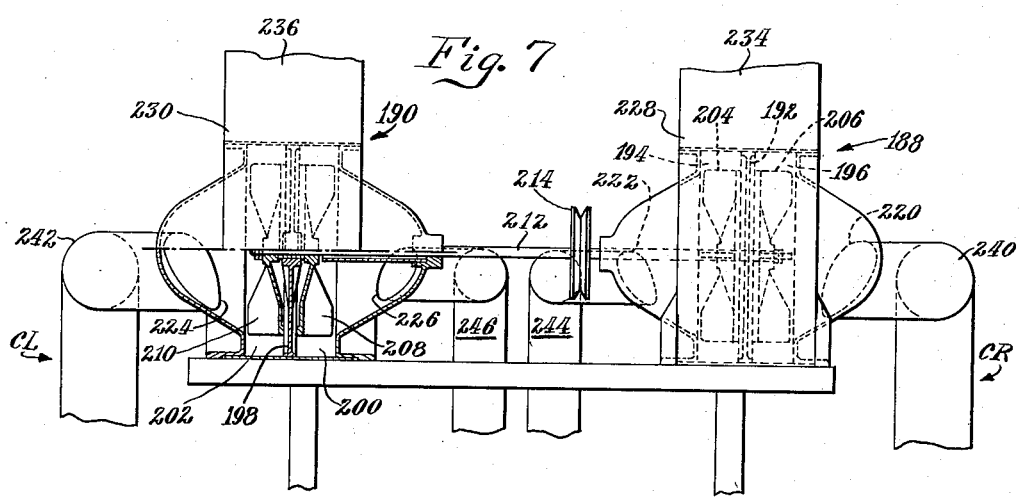
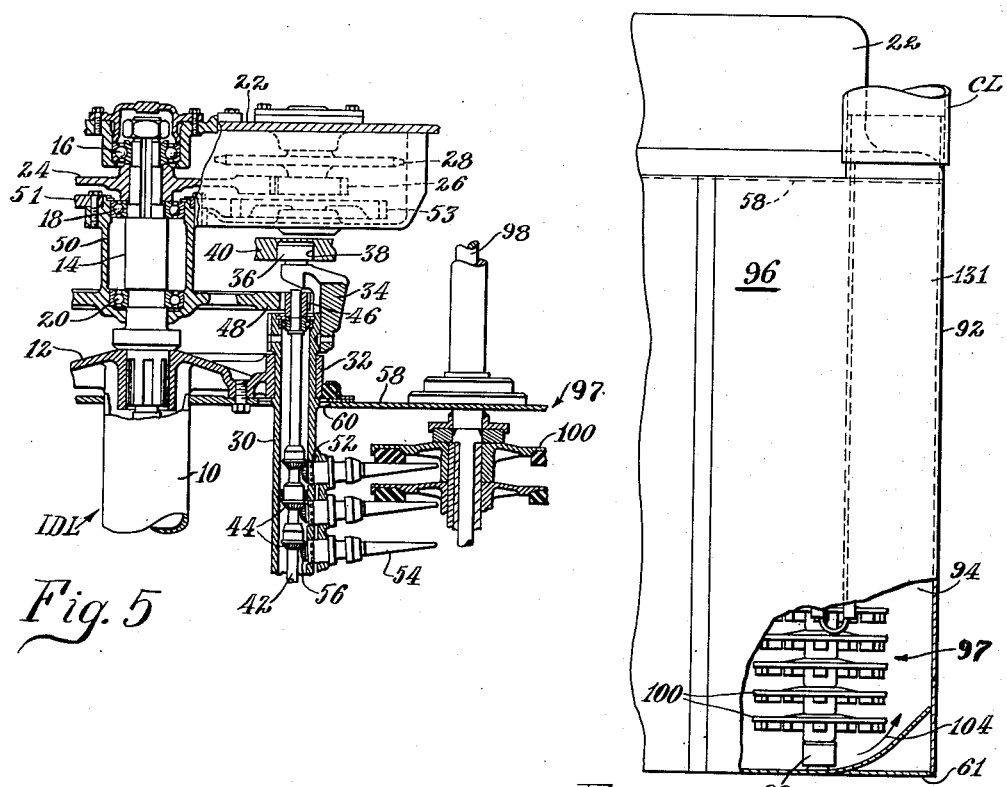
INVENTOR.
L. A. Paradise
BY
Attorney Patented Aug. 25, 1953

2,649,677

UNITED STATES PATENT OFFICE 2,649,677

MULTIROW CROP HARVESTER

Louis A. Paradise, Moline, Ill., assignor to Deere & Company, Moline, Ill., a corporation of Illinois Application April 13, 1951, Serial No. 220,898

1 Claim. (Cl. 56—14)

This invention relates to a harvester and more particularly to a crop harvester of the type adapted to harvest crops simultaneously from a plurality of adjacent parallel rows. Still more particularly, the invention relates to a multi-row cotton picker.

There are several known types of crop harvesters adapted to harvest crops simultaneously from a plurality of adjacent rows. In many instances, whether or not a machine can be designed and operated as a multi-row harvester depends largely upon the type of crops being harvested. For example, it is relatively easy to design a corn picker that can pick two—and even four—rows of corn simultaneously, since corn is a crop that lends itself readily to harvesting by multi-row picking machines.

The conventional agricultural tractor is designed to accommodate row-crop operation of many kinds, including cultivating and harvesting in particular, and variations in wheel tread and adjustability of cultivating and harvesting implements make it possble for such tractor and associated implements to be readily accommodated to fields in which the rows are laid out or spaced at different intervals than rows in other fields. The very nature of a crop such as corn imposes no particular problem, since the picking mechanism is relatively simple and of relatively small lateral dimension compared with the picking mechanism necessary to harvest crops such as cotton, for example.

In any row-crop operation, the tractor or equivalent vehicle usually has such characteristic design as to place a pair of transversely spaced wheels astride a pair of adjacent rows so that one wheel runs immediately outside one row and the other wheel runs immediately outside the other row. If the tractor or equivalent vehicle is of the tricycle type, the single additional wheel or truck runs between the two rows of said pair of adjacent rows. For operation as a two-row machine, the tractor or vehicle will carry picking mechanism spaced apart transversely and positioned to operate respectively on plants in the two rows.

Substantially the same line of endeavor has been followed in the design of mobile units for picking cotton. Of the various types of picking mechanisms experimented with in the past, the choice of the majority of designers is the picking unit comprising a pair of drum-like elements having a plurality of horizontally spaced layers or series of picking spindles projectable into the cotton plant from one side of the row and movable lengthwise of the row in an orbit or closed path. There are two such drums, one at each side of a particular row. In some cases, the drums are made up of a series of columns arranged in circumferentially spaced relationship, each column having a plurality of generally radially and horizontally projecting spindles. Mechanism is provided for moving the columns through the orbit or closed path and at the same time for rotating the spindles, which are barbed to accumulate cotton thereon. Since the spindles of the companion drums are projected into the plants from opposite sides, it is important to offset the drums longitudinally of the direction of travel so that the spindles do not conflict. Substantially the same problems are involved in other types of picking units, wherein the drum-like elements may include a plurality of horizontally movable continuous belts, for in either case the spindles move in orbits or closed paths. The fundamental of either design is that the spindles are projected into the cotton plants to accumulate cotton thereon and then are withdrawn from the plants and are moved through suitable doffing mechanism which functions to remove the cotton from the spindles so that the picked cotton may be conveyed to a suitable receptacle.

Because of the inherent complexity and size of the picking elements, most mobile cotton pickers in the past have been of the one-row type. This is so, because it has heretofore been impossible to place the pair of drums of one unit alongside the pair of drums of another unit on account of interference between the inner drums of the units; that is, because of interference or overlapping between the spindles or equivalent picking members of the inner drums. Hence, any known machines of the two-row type have included longitudinally spaced units, one being at the front of the mobile frame and the other being at the rear of the mobile frame so that there would be sufficient distance between the units to avoid overlapping or conflict between the inner spindles.

There are several disadvantages inherent in a machine of this type. First of all, the machine must be made of relatively substantial length to accommodate the longitudinally spaced units. Second, both units are not advantageously placed with respect to the operator of the machine, since it is virtually impossible to locate the operator in such position that will enable him to see cotton plants entering both units. The importance of the factor of visibility will become apparent when it is considered that most one-row machines are so designed that the operator is above and alongside the single unit. Furthermore, the longitudinal spacing of the units renders it impossible to adequately guide the machine, because steering of the machine to accommodate plants in one unit will obviously mis-aline the other unit with respect to the plants.

According to the present invention, all the disadvantages of a two-row machine as known in the past are eliminated and at the same time all the advantages of the one-row machine are retained. This result is achieved by use of a design which involves basically the provision of a pair of redesigned one-row units placed side-by-side and in transverse alinement. Thus, both units are placed in such position that the operator of the machine may watch plants in both rows at the same time.

It is an important feature of the invention, by means of which the two-row design is accomplished, to arrange a pair of units in side-by-side relationship and to provide each unit with a pair of picking elements, one element in each unit being an outer element and the other being an inner element. The outer elements are in transverse alinement and the inner elements are in transverse alinement, but the inner elements are offset longitudinally with respect to the transversely alined outer elements. Inasmuch as the inner elements are relatively closely spaced apart, they are designed to have reduced size and therefore reduced capacity so that the picking members or spindles thereof will not overlap or conflict across the longitudinal centerline between the two adjacent rows being picked. It is fundamental in the achievement of this object of the invention that the inner elements can be so reduced in size and capacity without sacrificing much in the over-all efficiency of the machine. It has been discovered that in the ordinary cotton picker, with one drum placed ahead of the other, the leading drum picks a considerably larger percentage of the cotton than does the trailing drum, which operates at the other side of the row. In the present design, the larger drum in each unit is preferably placed ahead of the smaller drum and arranged to operate outside the particular row. Hence, the larger drum picks the greater proportion of cotton, whereas the smaller drum picks the smaller proportion. In other words, the drums are proportioned commensurate with their picking capacity as related to their positions with respect to which is first to enter the row.

It is a further object of the invention to utilize to as great an extent as possible conventional picking elements or drums. Another object of the invention is to arrange the doffing mechanism for the picker spindles in such manner that the over-all width of the machine is kept at a minimum and so that the doffers for the inner drums are located respectively at opposite sides of the longitudinal centerline that lies midway between the two rows and hence that lies midway between the two units.

It is a still further object of the invention to provide a cotton picker of the mobile type comprising a longitudinal frame having a pair of transversely spaced and alined wheels and to arrange the picking units in transverse alinement and in such manner as to extend transversely across the frame generally between the outer upright longitudinal planes of the wheels, whereby the machine may be operated astride a pair of adjacent rows without interfering with the cotton plants in nearby rows.

A further and no less important object resides in the design and arrangement, in a two-row machine, of the picking units in such manner as to accommodate the structure of the units to that of the propelling vehicle. In a vehicle of the character having large traction wheels in front, considerable difficulty is encountered in placing the doffing means relative to the picking means and further relative to the wheels and vehicle axle structure. According to the present invention, these difficulties are eliminated.

The foregoing and other important objects and desirable features encompassed by and inherent in the present invention will become apparent as a preferred embodiment of the invention is completely disclosed in the following detailed description and accompanying sheets of drawings, in which Figure 1 is a perspective view of a mobile cotton harvester;

Figure 3 is a side elevational view, with the near wheel removed, of the forward portion of the machine as illustrated in Figure 2;

Figure 4 is an enlarged plan view of one of the picking units, certain portions of the uppermost structure being broken away to expose the picking mechanism therebelow;

Figure 5 is a fragmentary sectional view, drawn to an enlarged scale, taken substantially along the line 5—5 of Figure 4;

Figure 6 is a fragmentary rear view on an enlarged scale, with a portion broken away, to illustrate the relationship between part of the pneumatic conveying system and the doffing means for one of the drums, the view being taken substantially as viewed along the line 6—6 of Fig. 4;

Figure 7 is a fragmentary transverse sectional view on an enlarged scale, as seen substantially along the line 7—7 of Figure 3.

Figure 1:
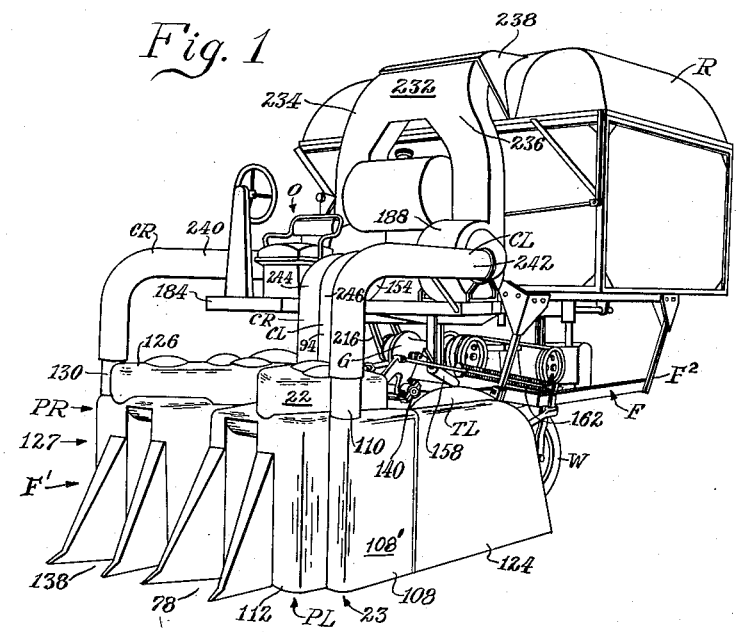

*General construction (Figures 1 and 2)*

The machine comprises essentially a longitudinal frame F carried at its front end $F^1$ on a pair of large, transversely spaced and alined traction wheels, these being right and left wheels TR and TL respectively. The rear end $F^2$ of the frame F is carried on a steerable truck comprising a single wheel W.

Figure 2:
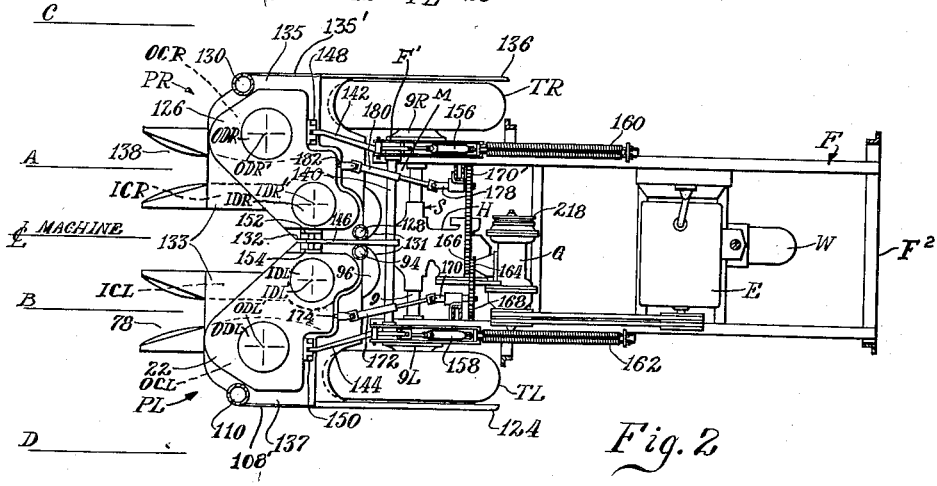
Figure 2 is a plan view on a reduced scale of the machine shown in Figure 1, omitting the receptacle and allied superstructure.

The machine carries at its forward end cotton-handling mechanism comprising a pair of transversely spaced and alined picking units designated PR and PL. These units are preferably disposed ahead of the traction wheels TR and TL and respectively operate on plants in two parallel adjacent rows A and B. In Figure 2, other rows C and D respectively outside the rows A and B are indicated to give a general idea of the over-all width of the machine.

The machine is preferably of the self-propelled type and for that purpose is provided with an internal combustion engine E which transmits power to a gear case G from the mechanism within which power is transmitted to the traction wheels TR and TL. The traction wheels are part of a forward axle structure S that comprises a transverse axle housing 9 having respectively at its right- and left-hand ends respectively depending final drive housings 9R and 9L which respectively carry stub axles (not shown) for the traction wheels TR and TL. The depending housings give the transverse axle housing 9 added clearance above the ground. Since the axle structure is rearwardly of the front parts of the traction wheels, there is defined a mounting space M in which portions of the picker units are accommodated, as will presently appear. The axle structure S includes a central transmission and differential housing H appropriately associated with the gear case G.

The machine includes superstructure comprising framework that carries a receptacle or basket R to which cotton is transferred from the picking units PR and PL by means of a pneumatic system including appropriate ducts or conduits CR and CL. The forward central part of the superstructure includes an operator's station O which has an operator's seat and suitable controls incidental to the operation of the machine.

*Detailed description of the picking units*

In this phase of the description, particular reference will be had to Figures 4 and 5. Since the two picking units or cotton handling mechanisms PR and PL are symmetrical, only one will be described in detail. That illustrated in Figures 4 and 5 is the unit PL.

This unit comprises a pair of harvesting or picking devices, one being an inner picking device in the form of a drum IDL and the other being an outer picking device or drum ODL, which operate respectively on the inside and outside of plants along the row B. The inner drum comprises essentially a structure that may be very similar to that disclosed in the U. S. Patent to Johnston 2,140,631, and has a central supporting shaft 10 (Figure 5) to the upper end of which is fixed a circular head member 12. The shaft 10 has keyed thereto an upper coaxial extension 14 that is journaled in suitable spaced-apart bearings 16, 18 and 20 carried in a supporting housing means or casting 22 from which depends wall means 23 forming a chamber for the cotton-handling mechanism. The drum IDL is thus rotatably suspended from the casting or support 22 and is driven by mechanism including a gear 24 fixed to the shaft extension 14 between the bearings 16 and 18. The gear 24 is in constant mesh with a smaller gear or pinion 26 which is coaxial with and fixed to a driving sprocket 28. This sprocket receives power from the internal combustion engine E by means that will be generally described below.

Those to whom the general details of construction are familiar will appreciate that there is at the bottom of the shaft 10 a suitable support therefor, plus an additional circular member somewhat like the circular head member 12. These two head members support therebetween a plurality of circumferentially spaced tubular columns 30. Each column is angularly movable about its vertical axis in the supporting members (such as in the circular head member 12), a bearing 32 being provided for each column for this purpose and similar bearings (not shown) being used at the bottoms of the columns. The columns, together with the supporting circular member 12 and the bottom member (not shown) form a cage or drum rotatable about the axis of the shaft 10. Hence, the columns move through a circular orbit or closed circular path. At the same time, the columns 30 are individually oscillated in their bearings 32. For this purpose, each column extends upwardly past the circular member 12 and has fixed thereto a crank 34 which is provided with a roller 36 that operates in a cam track 38 formed in a cam member or plate 40. This member 40 is fixed as respects the supporting structure or casting 22. The cam track, as will best be seen in Figure 4, is non-circular and hence defines an orbit or closed path different from the circular orbit through which the columns move.

Each of the tubular columns 30 carries rotatably therein and coaxially therewith a shaft 42 to which is fixed at vertically spaced intervals a plurality of small bevel pinions 44. The shaft 42 projects at the upper end of the columns 30 and has keyed thereto a small pinion 46 which is in constant mesh with a large gear 48 fixed to a sleeve 50 that surrounds and is rotatable relative to the shaft extension 14. The sleeve fixedly carries a gear 51 that is in constant mesh with a pinion 53 fixed to the pinion 26. Hence, the drum IDL is rotatable about the axis of the shaft 10 relative to the gear 48, the drum shaft 10 and gear 48 being driven at different speeds because of the different gear ratios at 26–24 and 53–51. The shafts 42 in the columns 30 are therefore rotated at a relatively high speed.

Each column 30 is provided, at vertically spaced intervals on the order of the spacing of the bevel pinions 44, with a plurality of outwardly opening bearing portions 52. Each of these bearing portions carries rotatably therein a generally radially outwardly extending picking member or spindle 54. The inner end of each spindle has a small bevel pinion 56 in constant mesh with the respective bevel pinion 44 on the shaft 42. Although the axes of the spindles 54 are slightly inclined to the horizontal, it will be noted that the outer surfaces of the spindles are conical. Hence, the uppermost element in the cone of each spindle lies in a horizontal plane and always remains in that horizontal plane as the spindles rotate and move through their orbits.

In a preferred construction built along the lines of the present invention, there will be in the inner drum IDL twelve columns 30. Each of these columns will carry twenty spindles 54. Hence, the spindles are in vertically spaced, horizontal series or layers, the spindles of each series being movable through an orbit determined by the cam track 38. Since the series of spindles are identical, and since all are controlled by the cam track 38, all the orbits of spindle movement will be the same. For all practical purposes, the structure may be considered as having a single series of spindles.

There is provided immediately below the casting or supporting structure 22, as part of the wall means 23, a horizontal plate 58 which is apertured at 60 to accommodate the inner drum IDL. A similar plate 61 (Figure 6) may be provided at the bottom of the drum structure.

The outer drum ODL is similar in construction and design to the inner drum IDL, except that it is larger; that is, it contains more picker bars or columns of the type designated by the numeral 30 in Figures 4 and 5. The outer drum has a central shaft 62 that corresponds to the shaft 14 for the inner drum IDL. The outer drum further includes a sleeve 64 that corresponds to the sleeve 50 of the inner drum. The outer drum has a plurality, here sixteen, of picker bars or columns 66. Each of the spindle bars or columns 66 may be identical in construction and design to those in the inner drum. Each column or bar carries a plurality of picker spindles 68 guided for travel through orbital movement by a cam plate 70 which has a cam track 72 formed therein.

The direction of travel of the machine is indicated by an appropriate legend in Figure 4. The path of movement of the spindles 54 as they travel through their orbits is in the direction of the arrow 74, and the drum and spindles in the outer drum assembly move in the direction of the arrow 76 (Figure 4). During forward travel of the machine, the plants along the row B (for example) enter a plant-receiving throat 78 defined at one side by a longitudinal upright wall 80 to which are attached a plurality of rearwardly extending, vertically spaced grid bars 82. The throat 78 is defined at its other side by a plurality of rearwardly extending, vertically spaced grid bars 84 which terminate in an upright longitudinal rear wall portion 86. The housing assembly forming the left-hand picking unit PL includes a rear wall 88 disposed upright and transversely closely ahead of the transverse axle structure S. This wall 88 terminates at its inner edge substantially along the line represented by the numeral 90 in Figure 4.

The extreme innermost side of the unit PL may be enclosed by a wall 92 or may be left open if desired along a longitudinal upright plane represented here by the wall 92. There is located at the right-hand rear or innermost corner of the picking unit PL an upright conveying means or conduit 94 which forms part of the left-hand pneumatic conveying system CL. This conduit opens downwardly (Figure 6) to the chamber or compartment ICL just rearwardly of the inner drum IDL and the rear portion of the unit is enclosed by a curved wall 96 that begins along the edge or line 90 and terminates upon meeting the conduit 94, as best shown in Figure 4.

As stated above, the direction of rotation of the inner drum IDL is in the direction of the arrow 74. This means that as the drum rotates inwardly with its cotton-laden spindles 54, the spindles will be withdrawn into the chamber to the right or inwardly of the grid bars 82, thus moving toward the general direction of the conduit 94. In order that the cotton will be removed from the laden spindles 54, there is provided doffing means 97 which may be more or less conventional. This doffing means is represented by an upright shaft 98 journaled at its upper end in the top plate 58 (Figure 5) and journaled at its lower end in the bottom plate (not shown). The doffing means further includes a plurality or series of vertically spaced, circular doffing elements 100. The complete assembly 97 is mounted so that it rotates in the direction of the arrow 102 in Figure 4. Thus, as the spindles 54 are caused to move in their orbital path, they pass respectively below the doffing members 100, and the cotton on the spindles is doffed therefrom and is moved in the direction of the arrow 102 to enter the conduit 94 from the bottom, as represented by the arrow 104 in Figures 4 and 6. Conventional design in this respect has been departed from in order to accommodate the inner drum to the two-row machine, as will be more completely particularized below.

The picking unit PL is enclosed at its rear between the inner wall 86 at the rear of the grid bars 84 and the left-hand outer wall by means of a transverse upright rear wall structure 106 that lies closely ahead of the left-hand traction wheel TL. The left-hand or outer wall referred to is designated by the numeral 108 and in this case leads to an upright conduit 110 likewise forming part of the pneumatic conveying system CL. The front of the unit PL ahead of the outer drum ODL is enclosed by an upright curved forward wall 112, which leads from the conduit 110 to the forward portions of the grid bars 84. Incidentally, the front portion of the chamber or compartment ICL which houses the inner drum IDL is closed by a short transverse upright front wall 114, which adjoins the short upright wall 80 and extends outwardly to the plane or surface 92, all as best shown in Figure 4.

Referring again to the left-hand outer drum ODL, it will be noted that the same principle involved in the inner drum IDL is to a certain extent followed here. That is to say, the direction of rotation of the drum, being as represented by the arrow 76, is such as to cause the cotton to move rearwardly and inwardly. In the left-hand rear corner of the chamber that houses the outer drum ODL, there is located a doffing unit represented generally by the numeral 116. The doffing unit or means 116 may be identical to the doffing means 97 for the inner drum IDL. This doffing unit rotates in the direction of the arrow 118 so that the doffing means removes cotton from the laden spindles 68. Because of the direction of rotation at 118, the doffing means 116 throws the cotton forwardly or in the direction of the arrow 120 in Figure 4 so that the cotton enters from below and upwardly into the conduit 110 as represented by the arrow 122 in Figure 4.

As previously stated, the invention has for an important feature thereof the design and arrangement of the picking units so that they will be accommodated as closely as possible within the space limitations afforded by the particular vehicle on which the units are mounted. For example, as will be seen in Figure 4, the rear wall structure 88—90—96 of the inner portion of the unit PL is closely ahead of the axle structure S, whereas the outer drum structure is ahead of the traction wheel PL. This means that the inner drum and its associated components are relatively long and narrow, and the outer drum and its components are somewhat shorter but wider. The problem is primarily one of accommodating the units to the space available. In the past, the design and production of two-row units has never been achieved, because of the design difficulty referred to. However, according to the present invention, this difficulty is eliminated by the arrangement disclosed, comprising in particular the relocation of the doffing means 97 for the inner drum IDL. In short, the inner drum IDL, the doffing means 97 and the conduit 94 are substantially one behind the other in the arrangement ahead of the axle structure S and between the centerline of the machine and the plane of the inside face of the left-hand traction wheel TL. Stated otherwise, the conduits 94 and 110 are at what might be called diagonally opposite corners of the generally rectangular picking unit structure. The outer wall 108 alongside the outer drum ODL provides an outer side 108' that is just slightly outside the plane of the outer face of the wheel TL. In the present instance, a wheel shield or skirt 124 is shown as a rearward extension of the wall 108.

As stated above, the right-hand picking unit PR and the left-hand picking unit PL are symmetrical. The relationship between these two units can best be seen in Figure 2. In this figure, the legends IDL' and ODL' designate respectively the vertical centerlines of the left-hand inner drum and the left-hand outer drum. This designation of parts will serve to orient Figure 2 with Figure 4.

The legends IDR' and ODR' designate respectively the right-hand inner drum centerline and the right-hand outer drum centerline and OCR and ICR indicate the right-hand outer and inner compartments. It will be seen from Figure 2 that the two inner drums, which are substantially smaller than the outer drums, are relatively closely spaced and are in transverse alinement. The outer drums are relatively widely spaced apart transversely and are in transverse alinement on a line ahead of the transverse line through the inner drums IDR and IDL. Stated otherwise, the inner drum of each unit is offset rearwardly and inwardly from its companion outer drum and each inner drum structure is confined wholly to its own side of the longitudinal centerline of the machine.

The right-hand picking unit PR includes casing or supporting structure 126 and depending wall means 127 symmetrical with the casing or supporting structure 22—23 for the left-hand unit. The wall means 127 is made up of walls (not shown in detail) similar to those in the unit PL. Likewise, the unit PR has vertical tubular conduits 128 and 130 associated respectively with doffers (not shown but the presence of which is obvious) for the right-hand inner and outer drums, these tubular conduits being part of cotton-receiving means for the right-hand pneumatic conveying system CR. The inner side of the right-hand unit PR is provided with an upright longitudinal wall 132 (Figure 2) which closely parallels the comparable wall 92 of the unit PL. The wall 132 closes the inner or left-hand side of the right-hand inner drum structure IDR.

The combined supporting structure 22—23, 126—127 for the cotton-handling mechanism PL, PR provides a central rear part 131, that lies within the mounting space between the wheels TR and TL and the axle S, and a forward part 133 that extends transversely across the frame F between the longitudinal upright outer planes of the wheels TL and TR in what may be termed right- and left-hand wing parts 135 and 137, thus giving each unit generally an L-shape as viewed from above. The unit PL is provided with the rearwardly extending, upright shield 124 which lies along the outer face of the left-hand traction wheel TL. The right-hand unit PR is provided along its outer side with a side wall 135' and similar shield 136 lies along the outer plane of the right-hand traction wheel TR. It will be seen from Figure 2 that the overall width of the machine is substantially less than the distance between the rows C and D. Thus, the machine may operate on the two adjacent rows A and B without materially interfering with the plants in the remote rows C and D. The unit PR has a plant-receiving throat 138 similar to the throat 78 for the unit PL.

The two inner picking drums are located in the central part 131 of the combined supporting and housing structure; the outer drums are located ahead of the inner drums and are offset outwardly respectively to the right and the left so as to be located respectively in the wing parts 135 and 137. This construction places the outer drums respectively outside the right- and left-hand throats 138 and 78, and the inner drums or devices at the inner sides of these throats. Further than this, the forward and outer drums or devices are ahead of the inner drums or devices so that the former pick in advance of the latter.

Of still further importance is the location of the doffing means. The doffing means for the inner drums are located respectively substantially directly behind the inner drums, whereas the outer doffing means for the outer drums are located outwardly and slightly to the rear of the outer picking devices. The general design is carried out in the location of the conduits for the rear or inner devices, these conduits being located respectively substantially directly behind the doffing means for the rear devices. On the other hand, the conduit means for the outer drums and outer doffing means are located respectively laterally outwardly and forwardly of the outer doffing means. This design enables the use of a narrower supporting structure at the rear so as to be accommodated in the mounting space between the wheels and the transverse axle S. Increased width of the supporting and housing structure is accommodated by the wing portions or parts 135 and 137 which extend respectively ahead of the right- and left-hand traction wheels TR and TL. The compact organization of components is such as to center the entire mechanism ahead of the frame F and desirably closely ahead of the axle S so that the mechanism may be supported in the manner to be described below.

The cotton-handling mechanism comprising the picking units PR and PL is supported at the forward end of the frame by means including a transverse rockshaft 140, a right-hand supporting arm 142, a left-hand supporting arm 144 and a center supporting arm 146. These arms are rigidly fixed at their rear ends to the rockshaft 110 and are pivotally connected at their forward ends respectively to a plurality of brackets 148, 150 and 152 and 154, the latter two combining at the inner portions of the picking units PR and PL to accomplish a connection with the forward end of the central arm 146.

The picking units PR and PL are adjusted vertically through the arms 142, 144 and 146 by fluid-pressure means including hydraulic cylinder and piston assemblies 156 and 158 located respectively at the right- and left-hand sides of the machine. Assist springs 160 and 162 are respectively associated with the cylinder and piston assemblies 126 and 128. This arrangement may follow conventional constructions and need not be amplified here.

*Driving mechanism*

As previously stated, the machine is powered by the internal combustion engine E, which drives through appropriate power-transmitting means included in the gear casing G, the transmission and differential H, the transverse axle structure S and the traction wheels TR and TL. The gear housing G carries a forwardly projecting shaft (not shown) to the forward end of which is keyed a pair of sprockets 164 and 166. A chain 168 from the sprocket 164 drives a larger sprocket on a longitudinal short shaft 170 at the left-hand side of the frame F. This shaft is connected by an appropriate universal joint and a propeller shaft 172 to an input shaft 174 that projects from a rear portion of the casing structure 22 of the left-hand unit PL. The shaft 174 supplies power for the sprocket 28 and gears 26 and 53 previously described.

The other sprocket 166 from the gear casing G drives through a chain 176 to a sprocket 170' on a shaft 178 located at the right-hand side of the frame. This shaft is connected by appropriate universal joints and a forwardly extending propeller shaft 180 to an input shaft 182 for the right-hand unit PR. This shaft supplies power to the mechanism of the right-hand unit, much in the manner that the shaft 174 furnishes power for the mechanism in the left-hand unit.

Superstructure

The operator's station O is carried on superstructure in the form of a platform 184 appropriately carried by upright brace means 186 from a forward portion of the frame F. As will be seen in Figures 1 and 3, the platform extends forwardly and overhangs the mounting space that is occupied by the rear central part 131 of the cotton-handling mechanism. The location of the operator's station gives the operator an adequate view of both picking throats 78 and 138 and a complete view of the visible operating mechanism.

The superstructure extends rearwardly and is utilized as part of the means for supporting the receptacle R, the details of which are not important here.

Pneumatic conveying system

The pneumatic conveying system includes the right- and left-hand conduits CR and CL, together with suction fan means comprising a pair of fan housings 188 and 190. These housings are carried in any appropriate manner on the superstructure 184 rearwardly of the operator's station O. As will be seen in Figure 7, the fan housings 188 and 190 are spaced apart transversely and are centered substantially on the centerlines of the rows A and B. Further, the fan housings are substantially directly behind the picking units PR and PL.

The fan housing 188 is separated by a partition 192 into inner and outer compartments 194 and 196. The other housing is of similar construction, having a dividing partition 198 that separates the housing into two interior compartments 200 and 202. A plurality of impellers or fans 204, 206, 208 and 210 respectively occupy the compartments 194, 196, 200 and 202. The fans or impellers are mounted on a transverse shaft 212 to which is keyed a sheave 214 driven by a belt 216 from a driving sheave driven from the gearing G (Figures 3 and 7).

The fan housing 188 has a pair of inlets 220 and 222 and the fan housing 190 has a similar pair of inlets 224 and 226. These inlets communicate individually with the compartments 194, 196, 200 and 202 of the fan housings. The fan housings further have respectively discharge outlets 228 and 230. The outlet 228 is common to the compartments 194 and 196 and the outlet 230 is common to the compartments 200 and 202. A discharge conduit 232 has twin branches 234 and 236 communicating respectively with the fan housing outlets 228 and 230. The branches merge to discharge through a hood 238 into the receptacle R.

The fan housings serve to draw or convey cotton from the cotton-handling mechanism by means of the conduit systems CR and CL. For this purpose, the right-hand conduit system CR includes an outer conduit 240 which extends between the fan inlet 220 and the interior of the wing part of the right-hand picking unit PR. As previously stated, the connection at 130 is forwardly of the right-hand outer doffing means. Therefore, the conduit 240 is above and substantially within the plane of the outer side of the right-hand picking unit PR. Also, the conduit 240 is above the level of the superstructure 184.

The conveying means is symmetrical in all respects, to follow the symmetry of the picking units PR and PL. To this end, the left-hand part of the conveying system PL has an outer conduit 242 which extends between the inlet 224 of the fan housing 190 and the upright conduit 110 of the outer doffing means for the left-hand picking unit PL.

A pair of inner conduits 244 and 246 communicate respectively between the fan inlets 222 and 226 and the inner doffing means upright conduits 128 and 94. The conduits 244 and 246 likewise extend above the level of the superstructure and extend downwardly to join the upright conduits 128 and 94, which, as aforesaid, are in the rear part 131 of the cotton-handling mechanism.

Summary

It will be seen from the foregoing description that the desirable objects outlined at the beginning of the specification are admirably achieved by the design and construction disclosed. Primarily, the arrangement enables the first capable adaptation of a two-row picking machine to a vehicle of the self-propelled type. It is immaterial whether the vehicle is a conventional tractor of standard design or whether the tractor is a modified version of the standard design. Likewise, and as shown here, a special carrying vehicle for the picker may be provided. In any case, the characteristics will be the same; namely, the redesign of conventional picking units so as to adapt the cotton-handling mechanism to utilization with such carrying vehicle so as to operate simultaneously on two rows of cotton. In this respect, it is important that the cotton be picked from both sides of the two rows.

The arrangement of the external parts of the mechanism, such as the conveying mechanism, is arranged symmetrically so as to attain maximum efficiency and at the same time enhance the appearance of the machine.

Other important features of the invention not specifically enumerated herein will undoubtedly occur to those versed in the art, as likewise will numerous modifications and alterations in the preferred embodiment of the invention illustrated, all of which may be achieved without departing from the spirit and scope of the invention as defined in the appended claim.

What is claimed is:

A harvester for picking cotton in a field in which the cotton has been planted in uniformly spaced parallel rows, comprising: a vehicle frame including a transverse axle structure and right- and left-hand wheels carrying the frame for advance over the field with the frame centered on the centerline between two adjacent parallel rows and with the right- and left-hand wheels spaced apart to straddle, and to travel respectively closely along the right- and left-hand sides of, said two rows, the relationship between said axle structure and wheels being such as to provide a mounting space between the wheels and ahead of the axle structure; cotton-handling mechanism positioned ahead of the axle structure and supported on the frame, said mechanism including a pair of right-hand picking devices for picking cotton from both sides of the right-hand one of said two rows and a pair of left-hand picking devices for picking cotton from both sides of the left-hand one of said two rows; said mechanism further including a right-hand pair and a left-hand pair of suction conduits communicating respectively with the picking devices for carrying away cotton picked by said devices; suction fan means carried by the frame and including right- and left-hand fan housings spaced apart transversely, each housing being partitioned into two compartments and each compartment including a separate inlet, a separate fan, and a separate outlet; means for driving the fans of each housing simultaneously; four cotton-conveying conduits connecting the suction conduits respectively with the inlets of the fan housings; and a single discharge conduit having a pair of branches, one branch connected and common to the outlets of one housing and the other branch connected and common to the outlets of the other housing.

LOUIS A. PARADISE.

References Cited in the file of this patent

UNITED STATES PATENTS

| Number | Name | Date |
|---|---|---|
| 1,636,132 | Hoofnagle | July 19, 1927 |
| 2,073,653 | Rust et al. | Mar. 16, 1937 |
| 2,140,631 | Johnston | Dec. 20, 1938 |
| 2,175,216 | Rust | Oct. 10, 1939 |
| 2,241,423 | Rust | May 13, 1941 |

OTHER REFERENCES

McCormick-Deering Cotton Pickers, published by International Harvester Company, A-196-H H, dated Aug. 21, 1944.